United States Patent Office 3,101,245
Patented Aug. 20, 1963

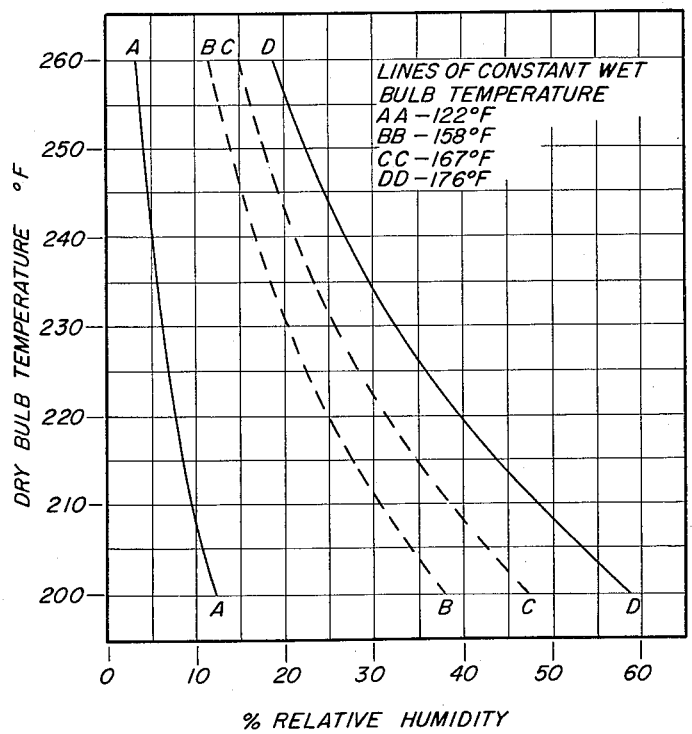

3,101,245
PRODUCTION OF POLYACRYLONITRILE FIBERS
Yoshimasa Fujita, Takeshi Okazaki, and Keijiro Kuratani, all of Saidaiji City, Japan, assignors to American Cyanamid Company, New York, N.Y., a corporation of Maine
Filed Aug. 18, 1960, Ser. No. 50,440
1 Claim. (Cl. 18—54)

This application is a continuation-in-part of our co-pending application Serial No. 25,783, filed April 29, 1960, and now abandoned.

This invention relates to a method of improving the quality of polyacrylonitrile fibers, and especially increasing their knot strength as well as dyeability. The method is characterized by drying (conditioning) a fiber produced from an acrylonitrile polymer, and which has been previously stretched to orient it, under the specific conditions of temperature and humidity shown in the graph of the accompanying drawing. During drying water is removed substantially completely from the fiber and its structure is collapsed. Thereafter, the dried or conditioned fiber is treated with heat in an atmosphere of steam at an elevated temperature higher than 105° C. but lower than 160° C.

Various methods of producing filaments, films and other shaped articles from homopolymeric acrylonitrile and from copolymers of a major proportion of acrylonitrile and a minor proportion of another monomer or monomers heretofore have been suggested. For example, in Rein U.S. Patent No. 2,117,210, dated May 10, 1938, it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in Latham U.S. Patent 2,404,714; Rogers U.S. Patents 2,404,-715 and -725; Hansley U.S. Patent 2,404,716; Houtz U.S. Patents 2,404,713–722, -724 and -727; Merner U.S. Patent 2,404,723; Charch U.S. Patent 2,404,726; and Finzel U.S. Patent 2,404,728, all dated July 23, 1946, and also the use of such solutions in forming films, filaments, etc., therefrom.

Another method of producing filaments and other shaped products from polymers (homopolymers) and copolymers of acrylonitrile is disclosed and claimed in Cresswell U.S. Patent No. 2,558,730, dated July 3, 1951. The invention disclosed and claimed in that patent is based on the discovery that useful films, filaments, threads and other shaped articles can be produced from acrylonitrile polymerization products of the kind described therein and in the aforementioned patents, as well as hereinafter, by precipitating or coagulating the polymerization product in approximately its desired shape from a water-coagulable solution thereof, more particularly, a concentrated aqueous salt solution of the kind disclosed by Rein in his U.S. Patent No. 2,140,921, the precipitation being effected by contacting the said solution with a cold aqueous coagulant, more particularly water alone, at a temperature not substantially exceeding +10° C. This coagulant is a non-solvent for the polymerization product but will dissolve the solvent in which the said product is dissolved. Surprisingly, it was found that by keeping the temperature of the aqueous coagulating bath at or below +10° C., e.g., within the range of —15° C. to +10° C. and preferably at from about —15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product.

Still other methods of producing filamentary material from a polymer of acrylonitrile are known. For example, British Patent No. 714,530 describes a method wherein a thread is formed from a spinning solution containing a polyacrylonitrile and, as a solvent therefor, a mixture consisting essentially of water, one or more water-miscible, aliphatic liquids containing an alcoholic hydroxyl group and not more than 6 carbon atoms in the molecule, and one or more highly water-soluble salts of a particular class which includes the alkali-metal thiocyanates. In another process of producing threads from a polymer of acrylonitrile (British Patent No. 732,135), a solution of the polyacrylonitrile in a concentrated aqueous solution of a water-soluble salt that yields highly hydrated ions in an aqueous solution is extruded into an aqueous coagulating bath in which is dissolved at least 5% by weight of the same water-soluble salt used as a solvent for the polymer, the coagulating bath also containing a water-miscible alcohol.

Although processes such as are decribed briefly above and more fully in the aforementioned patents are, for the most part, operative and satisfactory in forming useful filamentary materials from homopolymeric and many different copolymeric acrylonitriles, processing improvements are often necessary in order to develop optimum properties in the product and/or to reduce its manufacturing cost. For example, and as is stated in Hare et al. U.S. Patent No. 2,677,590 and in Moody U.S. Patent No. 2,677,591, each dated May 4, 1954, the wet-spinning techniques described in the aforementioned Houtz U.S. Patent No. 2,426,719, in Watkins U.S. Patent No. 2,451,-420, dated October 12, 1948, and in Hare U.S. Patent No. 2,467,553, dated April 19, 1949 (wherein, in all cases, the acrylonitrile polymer is dissolved in an organic solvent), yield dense, lustrous, high-tenacity yarns from acrylonitrile polymers; but the spinning speed and the productivity are limited. The patentees, Hare et al. and Moody, state that a top speed of 100 yards per minute is obtained with glycerol as a coagulating bath, but that when less expensive aqueous salt solution is used as the coagulating bath, the spinning speeds are more of the order of 50 yards per minute. They further point out that it is desirable, from the standpoint of production economy, to spin a large number of filaments at high rates of speed into an inexpensive coagulating bath (e.g., water) from which the solvent for the polymer can be readily recovered; but that this results in yarns having varying degrees of porosity, depending upon the spinning condition; and that such porous yarns lack strength and luster, and their use in the textile art is extremely limited. The solution of Hare et al. to the problem was to wet the stretched, porous, polyacrylonitrile article with a volatile, liquid non-solvent for the polymer (e.g., water), and then to contact the thusly wetted article with a fluid (e.g., xylene) which also is a non-solvent for the polymer and which is immiscible with the aforementioned volatile, liquid non-solvent. The immiscible fluid is heated to a temperature of at least 100° C., but below the thermal decomposition point of the polymer, thereby to evaporate the volatile, liquid non-solvent from the polymer and to render the article substantially non-porous. Moody's solution was to subject the porous, filamentary, polyacrylonitrile article, wet with water, to lateral pressure against a solid surface at a temperature of at least 100° C., but below the thermal decomposition point of the polymer, until the water is removed and the polyacrylonitrile article is substantially non-porous. The heated surface could be a heated roll, round pin or a curved plate.

The problems encountered by Hare et al. and Moody when using a spinning solution comprised of a polymer of acrylonitrile dissolved in an organic solvent are generally non-existent when using a spinning solution comprised of an acrylonitrile polymer dissolved in a concentrated aqueous solution of a water-soluble salt which yields highly hydrated ions in an aqueous solution, e.g., a thiocyanate and specifically sodium thiocyanate; and extruding this solution into a cold (not exceeding $+10°$ C.) aqueous coagulating bath comprised of water alone or having dissolved therein from, for example, about 3% to about 20% by weight thereof of the same salt used in making the solvent for the acrylonitrile polymer, e.g., sodium thiocyanate. However, there does exist the same problem of collapsing the structure of the filamentary polyacrylonitrile in gel (specifically aquagel or hydrogel) state to a dense, compact solid while simultaneously removing the liquid phase (specifically water) therefrom. One would normally expect that the voids in such a gelled structure would expand or become enlarged by the application of heat, due to the action of the expanding water and its evolution from the mass; and that heat (either dry or humid) would be ineffective in satisfactorily collapsing the structure.

The novel features which are characteristic of our invention are set forth in the appended claims. The invention itself, however, will best be understood by reference to the following more detailed description when considered in connection with the single FIGURE of the accompanying drawing which is a graph of dry-bulb temperature in ° F. vs. minimum and maximum relative humidities that are employed in collapsing the structure of oriented, gelled, filamentary, polyacrylonitrile material of the kind with which this invention is concerned.

In the copending application of Thomas H. Robertson and George K. Klausner, Serial No. 755,020, filed August 14, 1958, as a continuation-in-part of application Serial No. 601,061, filed July 30, 1956, and now abandoned, which copending application (now Patent No. 2,984,912, dated May 23, 1961) is assigned to a common assignee with that of the present invention, it is disclosed that the structure of gelled, filamentary material comprised of water and an acrylonitrile polymer containing a major proportion by weight of combined arcylonitrile can be effectively and economically collapsed, and substantially uniform products of improved properties (e.g., better and more uniform dye receptivity, better abrasion resistance and "hand," less tendency to fibrillate, etc.) can be obtained by drying the said filamentary material under particular and critical correlated conditions of temperture and humidity. Specifically, the dry-bulb temperature should be within the range of from 200° F. to 260° F. and the minimum and maximum percentages of relative humidity should be those corresponding to wet-bulb temperatures of 122° F. and 176° F., respectively. Such lines of constant wet-bulb temperatures are shown as solid lines A—A and D—D in the graph of the accompanying drawing. Preferably, the desired results are achieved when the dry-bulb temperature is in the range of from 200° F. to 260° F. and the minimum and maximum percentages of relative humidity are those corresponding to wet-bulb temperatures of 158° F. to 167° F., respectively. Such lines of constant wet-bulb temperatures are shown as broken lines B—B and C—C in the accompanying graph. Drying under the above-described conditions can be effected while the filamentary material is under tension or while it is in a relaxed (untensioned) state.

In practicing the present invention, drying under the aforesaid temperature and humidity conditions is preferably effected while the gelled, polyacrylonitrile filamentary material is in a relaxed state, and has, at the start of the drying operations, a water content in excess of the critical value, using the term as it is commonly employed in chemical engineering practice (reference: Perry's Chemical Engineers' Handbook, 3rd Ed., p. 802, published in 1950 by McGraw-Hill Company, New York, New York). Drying is continued under these conditions until substantially all of the water has been evolved from the filamentary material and its structure has collapsed. By controlling the relative humidity during drying at the predetermined levels, the gelled material collapses uniformly and yields a product that can be uniformly dyed and that has other improved properties such as those mentioned above. In the absence of humidity control within the aforespecified range the material, if dried at humidities lower than those specified, contains opaque, uncollapsed areas that form off-shade colors when the product is dyed; or if dried at humidities in excess of those specified the material contains areas where sections of filamentary material in contact with each other will fuse, forming a cemented structure which is difficult to separate into the original individual filaments during subsequent processing. These phenomena are particularly objectionable when handling a plurality of substantially parallel filaments as are usually encountered in commercial practice.

By drying (conditioning) gelled, polyacrylonitrile filamentary material, more particularly such filamentary material which previously has been stretched to orient it, as said drying has been described briefly above and more fully in the aforementioned Robertson et al. copending application Serial No. 755,020, the filaments are collapsed in their structure and made dense, yielding dried filaments which show little tendency to fibrillate and have the advantage of uniform dyeability as far as the center of the filament. However, the filaments are not completely satisfactory in other properties, especially in knot strength and dyeability. Thus, as the result of our research, we have succeeded in greatly improving the filaments in their properties (especially in knot strength as well as dyeability, without diminishing such advantages as resistance to fibrillation and being dyeable as far as the center of the filament), by heat-treating the collapsed, dense filaments in an atmosphere of steam at an elevated temperature and while the filaments are in a relaxed state.

The present invention is based on our discovery that, when drying is effected under the specific conditions of temperature and humidity shown in the graph of the drawing, a heat-treatment with steam is required after substantially complete removal of water from the filaments, and that, if the structure of the filaments is not collapsed up to substantially complete removal of water, the structure tends to be formed again by the subsequent heat-treatment with steam.

Thus, the present invention is characterized by a combination of a particular drying process involving specific conditions of temperature and humidity, and a heating process involving the use of steam at an elevated temperature. Furthermore, in a preferred embodiment of the invention the filaments after being dried and before the heat-treatment with steam are immersed in a reducing liquid adjusted to a pH below 7.0, thereby to obviate or minimize any tendency of the filaments to discolor during the subsequent treatment with steam at an elevated temperature.

The term "acrylonitrile polymer," as employed in this specification and accompanying claims, means acrylonitrile homopolymer or a copolymer of acrylonitrile with one or more other copolymerizable monoethylenically unsaturated compounds such as vinyl compounds, or a blend of two or more of these polymers, provided that it contains at least 80% by weight of acrylonitrile. Thus the acrylonitrile polymer can be a fiber-formable copolymer containing at least 80% by weight of combined acrylonitrile and the remainder being comprised of at least one different monoethylenically unsaturated substance which is copolymerizable with acrylonitrile to yield the said copolymer. Examples of such copolymerizable compounds include methyl acrylate, methyl methacrylate, acrylamide, vinyl chloride, vinylidene chloride, vinyl acetate, p-styrenesulfonic acid and its derivatives, and vinylpyridine and its derivatives including 2-methyl-5-vinylpyridine. Additional examples of monomers that can be used in making acrylonitrile copolymers are given in the aforementioned Robertson et al. copending application Serial No. 755,020. Reference also is made to this same copending application for a more detailed description of methods of making the gelled (more particularly, the gelled, stretched) polyacrylonitrile, filamentary material which is further processed in accordance with the principles of the present invention.

After being stretched, more particularly hot-stretched, the gelled filamentary material may be rinsed if desired with, for example, water. Such a rinsing operation, however, is optional and may be omitted.

Following the rinsing step (if applied to the gelled material) the gelled filaments are dried under the temperature and humidity conditions herein disclosed, thereby to collapse the structure of the fiber and to improve its useful properties.

By way of example only and not by way of limitation, it is mentioned that one suitable form of apparatus for carrying out this operation is an apron or belt dryer. With such a dryer, the stretched, washed, wet filamentary material (e.g., tow), preferably having a water content in excess of the critical value, is fed to the tow-dryer belt or apron through a plaiter which spreads the tow evenly and in relaxed state over the entire dryer belt to form a uniform blanket. The belt is moving and carries the blanket of tow thereon through a hot, humidified zone or chamber which advantageously may be divided into a number of sections, e.g., three. If thusly divided into three sections, the first two sections may be designated as "drying-conditioning sections," in which the continuous filamentary material or tow is subjected to a blast of hot, humid air. Each of these two sections normally is provided with its own set of hot-air blowers, steam-heated, air heating coils, and humidifier steam nozzles. The third or last section may be designated as a "calming compartment" since, in this compartment, the blanket is not agitated by direct air blasts.

Optimum performance of a dryer of the kind above described depends upon such influencing variables as air temperature and humidity in each drying section, and the residence time. The latter may be defined as the number of minutes it takes any part of the filamentary material or tow to pass entirely through the first two sections wherein heat and humid conditions are applied. Ordinarily, the residence time will range between 10 and 60 minutes, more particularly from 15 to 45 minutes.

After the gelled, polyacrylonitrile filamentary material has been dried under definite conditions of temperature and humidity and to make it dense, as has been described above and in the aforementioned Robertson et al. copending application Serial No. 755,020, it is treated in a relaxed state in an atomsphere of steam at an elevated temperature ranging from 105° C. to 160° C.

As the reducing liquid to be used in practicing the preferred embodiment of the invention, an aqueous solution having a pH below 7 and containing formaldehyde-sodium sulfoxylate, sodium pyrosulfite, sodium bisulfite, sodium thiosulfate, sodium hydrosulfite, formaldehyde, acetaldehyde, or other reducing agents may be employed. An alkaline reducing liquid having a pH of more than 7 is not reccommended since it promotes discoloration of the fibers rather than preventing it.

For the adjustment of pH, an inorganic acid, such as sulfuric, hydrochloric, nitric, phosphoric, and other acids, or an organic acid, such as formic, acetic, oxalic, and other acids, may be used. A small amount of a surface-active agent or an organic solvent may be added to the reducing liquid in order to increase the effectiveness of the treatment.

The immersion is ordinarily effective at room temperature (20°–30° C.), but may be conducted at a lower temperature than room temperature down to 0° C., or at a higher temperature up to the boiling point, if necessary.

As to the period of the immersion, even such a short time as less than 1 minute is effective so long as the fibers or filaments are in a state where they are able to be contacted uniformly with the treating liquor, but the time may be longer if necessary or desirable, for instance ½ hour, or even an hour or longer.

The heating medium for the heat-treatment is steam at an elevated temperature. The temperature at which the treatment is conducted should be selected adequately according to such influencing factors as, for example, the chemical constitution and molecular weight of the polymer, denier of the filament, etc. A temperature of lower than 105° C. is undesirable because of the insufficient heat-treating effect, and a temperature of higher than 160° C. is also undesirable because of the tendency toward decomposition of the fibers at the higher temperatures. The most suitable temperature for each fiber should be selected within the range of from 105° C. to 160° C.

The treating temperature may be varied according to the properties of the filaments, denier of the individual filament, and the size of the bundle of filaments, but a duration of from 1 to 30 minutes is ordinarily sufficient so long as the steam at an elevated temperature can contact the fibers uniformly and rapidly.

The invention will be illustrated by the following specific examples, which do not limit the invention. The parts and percentages given in the examples are by weight.

EXAMPLE 1

Ten (10) parts of acrylonitrile copolymer composed of 90 parts of acrylonitrile and 10 parts of methyl methacrylate ($[\eta]^*$=0.2, measured using dimethylformamide as a solvent) were dissolved in 90 parts of a solution consisting of 45 parts of calcium thiocyanate and 45 parts of water. The solution was extruded into a cold coagulating bath comprised of a 10% aqueous calcium thiocyanate solution maintained at —1° C. The filaments were washed with water until they were substantially free of calcium thiocyanate, and stretched in boiling water 7 times as much as their original length. Then the filaments were dried in a hot-air dryer, wherein the temperature was 110° C. and the relative humidity 18%, until the water content was reduced to less than 1% (sample A).

The filaments were non-porous, uniformly dense in their construction, and showed no evidence of being ring-dyed (phenomenon where only the outside of the filament is dyed deeply but the inside is dyed lightly) or of fibrillation.

A portion of sample A was immersed in water, taken out of the water, and then squeezed until the water content amounted to 80% by weight of the dry filaments. Thereafter, it was heat-treated in relaxed state in steam at 125° C. for 5 minutes, and then dried in relaxed state in a hot-air drier at 95° C. until the water content reached less than 1% (sample B, according to the method of the invention).

Another portion of sample A was immersed in a 10% aqueous sodium bisulfite solution (pH 4), taken out of the solution, and squeezed until the liquor amounted to 80% by weight of the dry filaments. Thereafter, it was treated in the same manner as sample B (sample C, according to the method of the invention).

Colors of these fibers were measured by a spectrophotometer (Type Epu-2A, made by Hitachi, Ltd.), the

---

*$\eta$=intrinsic viscosity.

values being calculated per 100% of MgO standard white plate. The results are given in Table I.

Table I

| Sample | X | Y | Brightness (percent) | Main wave length (mμ) | Purity (percent) | Whiteness (percent) | Yellowness (percent) |
|---|---|---|---|---|---|---|---|
| A | 0.3175 | 0.3262 | 88.15 | 574.6 | 4.9 | 76.2 | 8.4 |
| B (method of the invention) | 0.3213 | 0.3312 | 86.50 | 574.4 | 7.3 | 64.3 | 12.3 |
| C (method of the invention) | 0.3176 | 0.3255 | 87.83 | 575.9 | 4.7 | 75.5 | 8.0 |

Dyeabilities of these fibers were also compared by dyeing the fibers with Sevron Brilliant Red 4G (trademark of E. I. du Pont de Nemours and Company), and determining the concentration of the dyestuff remaining in the dyebath using a photocolorimeter (No. 5 D-type, made by Kotaki Company) to measure the dyestuff exhaust. The conditions for dyeing and the dyestuff exhausts are as follows:

Conditions for dyeing:
  Dyestuff _____percent__ 1
  Ammonium acetate _____do____ 3
  Retarder Lan (trademark of E. I. du Pont de
    Nemours and Company)_____do____ 5
  (All percentages are based on weight of fibers.)
  Dye-bath ratio_____ 1:100
  Temperature _____° C__ 95
  Time_____minutes__ 60

Dyestuff exhaust:
  Sample—                                  Exhaust, percent
    A _____ 15
    B (method of the invention)_____ 51.5
    C (method of the invention)_____ 56.2

The strength and elongation of these fibers are given in Table II.

Table II

| Sample | Denier | Dry Strength (g./d.) | Dry Elongation (percent) | Knot Strength (g./d.) | Knot Elongation (percent) |
|---|---|---|---|---|---|
| A | 2.37 | 3.42 | 24.6 | 1.30 | 8.0 |
| B (method of the invention) | 2.86 | 3.38 | 39.6 | 2.85 | 35.6 |
| C (method of the invention) | 2.90 | 3.41 | 40.1 | 2.78 | 36.3 |

Five-tenths (0.5) gram of each of these samples which had been cut to 1 cm. length was added with 500 cc. of water and treated at 80° C. for 20 minutes in a mixer rotating at the rate of 3,600 r.p.m. The fibers were then taken out, and the fibrillations were observed through a microscope. All of the above-described samples A, B, and C were scarcely fibrillated. While the fibers treated as in samples B and C, without being processed for making them dense after heat-stretching, were appreciably fibrillated by the same experiment as above.

EXAMPLE 2

An acrylonitrile copolymer composed of 88 parts of acrylonitrile, 5 parts of methylvinylpyridine and 7 parts of methyl acrylate ([η]=0.18, measured using dimethyl formamide as a solvent) was spun, washed, stretched, and dried in the same way as in Example 1 (sample A).

A portion of sample A was immersed in water, and squeezed until the water content amounted to 80% by weight of the dry filaments. Thereafter it was treated in relaxed state in steam at 120° C. for 5 minutes, and then dried in a relaxed state in a hot-air drier at 95° C. until the water content was reduced to less than 1% (sample B, according to the method of the invention).

Another portion of sample A was immersed in a 10% aqueous sodium bisulfite solution (pH 4), taken out of the solution, and squeezed until the liquor content amounted to 80° by weight of the dry filaments, followed by the same treatment as in sample B (sample C, according to the method of the invention).

Colors of these samples were measured by the same method as that of Example 1. The results are given in Table III.

Table III

| Sample | X | Y | Brightness (percent) | Main wave length (mμ) | Purity (percent) | Whiteness (percent) | Yellowness (percent) |
|---|---|---|---|---|---|---|---|
| A | 0.3221 | 0.3322 | 80.14 | 573.7 | 7.7 | 62.2 | 13.0 |
| B (method of the invention) | 0.3265 | 0.3384 | 77.51 | 574.0 | 11.0 | 46.1 | 18.5 |
| C (method of the invention) | 0.3238 | 0.3329 | 80.72 | 575.3 | 8.4 | 58.9 | 14.3 |

Dyeabilities of these fibers were as follows, the method for determining the concentration of the dyestuff remaining in the dyebath being the same as that used in Example 1.

Conditions for dyeing:
  Calcofast Wool Bordeaux BB conc. (trademark
    of American Cyanamid Co.)_____percent__ 2
  Sulfuric acid_____do____ 4
  Glauber's salt_____do____ 5
  (All percentages are based on weight
    of fibers.)
  Dye-bath ratio_____ 1:60
  Temperature _____° C__ 93
  Time_____minutes__ 80

Dyestuff exhaust:
  Sample—                                  Exhaust, percent
    A _____ 25.0
    B (method of the invention)_____ 51.3
    C (methol of the invention)_____ 54.2

The strength and elongation of these fibers are given in Table IV:

Table IV

| Sample | Denier | Dry Strength (g./d.) | Dry Elongation (percent) | Knot Strength (g./d.) | Knot Elongation (percent) |
|---|---|---|---|---|---|
| A | 2.19 | 4.77 | 36.8 | 1.52 | 13.7 |
| B (method of the invention) | 3.03 | 3.15 | 49.3 | 2.99 | 42.5 |
| C (method of the invention) | 3.09 | 3.26 | 57.5 | 3.15 | 43.9 |

The fibrillation tendencies of these samples were determined by the same method as that of Example 1. All of the above-described samples were not fibrillated. The fibers treated as in samples B and C, without being processed for making them dense after heat-stretching, were appreciably fibrillated.

EXAMPLE 3

A portion of sample A in Example 2 was immersed in a 10% aqueous formaldehyde-sodium sulfoxylate solution aljusted at pH 4, taken out of the solution, squeezed until the solution content amounted to 80% by weight of the dry fibers, and then heat-treated in the same manner as was sample C in Example 2.

The color of the fiber was measured by the same method as that of Example 1. The results were as follows:

| X | Y | Brightness (percent) | Main-wave length (mµ) | Purity (percent) | Whiteness (percent) | Yellowness (percent) |
|---|---|---|---|---|---|---|
| 0.3242 | 0.3348 | 79.14 | 574.6 | 9.1 | 55.8 | 15.2 |

The dyestuff exhaust, determined by the same method as that of Example 2, was 52.1.

The strength and elongation of this fiber were as follows:

| Denier | Dry strength (g./d.) | Dry Elongation (percent) | Knot strength (g./d.) | Knot elongation (percent) |
|---|---|---|---|---|
| 3.10 | 3.08 | 54.3 | 3.01 | 45.1 |

EXAMPLE 4

A test similar to Example 1 was conducted on a polymer blend of 50 parts of homopolymeric acrylonitrile and 50 parts of a copolymer composed of 80 parts of acrylonitrile and 20 parts of vinylpyridine. Substantially the same improvements were obtained.

We claim:

The method of improving the quality of filamentary material which has been previously hot-stretched and which is comprised essentially of an acrylonitrile polymer, said method consisting in drying the said filamentary material in gelled state under correlated conditions of temperature and humidity, the temperature (dry bulb) being within the range of from about 200° F. to 260° F., the minimum and maximum percentages of relative humidity for a particular dry-bulb temperature being those falling between the lines A—A and D—D of the graph shown in the accompanying drawing, and the said drying under the said temperature and humidity conditions being continued until substantially all of the water has been evolved from the said filamentary material and its structure has collapsed; thereafter immersing said filamentary material in a reducing liquid having a pH below 7.0; and thereafter treating the resulting filamentary material in a relaxed state in an atmosphere of steam at an elevated temperature ranging from 105° C. to 160° C.

References Cited in the file of this patent
UNITED STATES PATENTS

| | | |
|---|---|---|
| 2,401,926 | Hadley | June 11, 1946 |
| 2,697,023 | Martin | Dec. 14, 1954 |
| 2,883,260 | Melchore | Apr. 21, 1959 |
| 2,920,934 | Schaefer | Jan. 12, 1960 |
| 2,952,033 | Goodwin | Sept. 13, 1960 |
| 2,984,912 | Robertson et al. | May 23, 1961 |